Feb. 5, 1929.
J. H. C. MURDOCH
1,701,242
LIFTING JACK FOR AUTOMOBILES
Filed Jan. 19, 1927
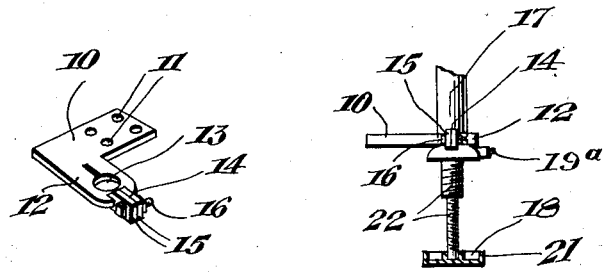
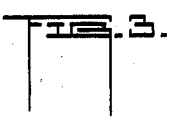
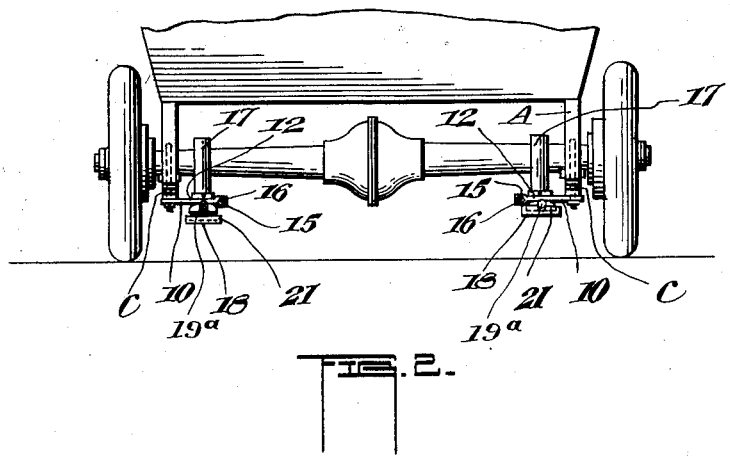
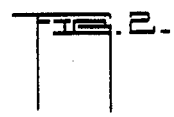
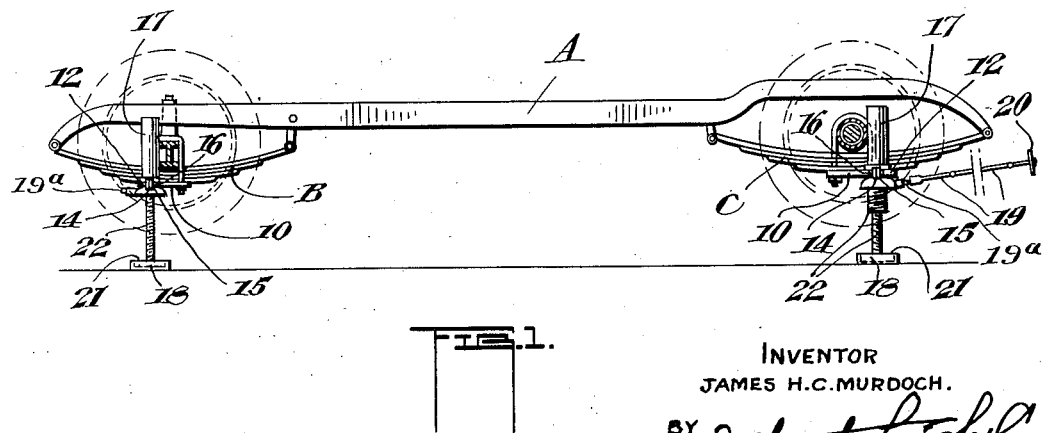
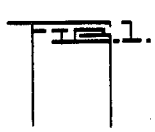
INVENTOR
JAMES H.C.MURDOCH.
BY Fetherstonhaugh & Co.
ATT'YS Patented Feb. 5, 1929.

1,701,242

UNITED STATES PATENT OFFICE.

JAMES HAROLD CURRIE MURDOCH, OF HALIFAX, NOVA SCOTIA, CANADA.

LIFTING JACK FOR AUTOMOBILES.

Application filed January 19, 1927. Serial No. 162,098.

This invention relates to improvements in lifting jacks for vehicles.

The objects of the invention are to provide a jack which will be attached to the vehicle in such a manner that it can be quickly changed or converted from an inoperative position to an operative position.

Further objects are to provide a jack of this description that forms part of the vehicle construction, that is of simple, durable and economical make and adapted to be included in existing automobiles without interfering in any way therewith.

Another object is to provide a jack of this description permanently arranged in a convenient position on the vehicle so that it will be available to an operative position under all circumstances.

Yet another object is to provide a jack permanently identified with the vehicle construction and so arranged as to materially expedite and facilitate changing of tires on the wheel of an automobile or the like.

A still further and important object is to provide a jack of this type permanently arranged in an operative position on the vehicle and readily operable on the car being put away in storage to support the car and thus take the weight off the wheels.

With the foregoing and other objects hereinafter more fully referred to in view, the invention comprises a lifting jack adjustably mounted in an extension of the spring supporting plate, a jack being usually provided for each wheel.

Referring now to the drawings in which like characters of reference indicate corresponding parts in each figure—

Figure 1 is a side elevation of an automobile in raised position showing my improved jack in operative or supporting position.

Figure 2 is a rear end elevation of an automobile showing the jacks fitted on the rear springs and in inoperative position.

Figure 3 is a partial sectional detail of the jack.

Figure 4 is a perspective view of the supporting plate for the jack.

Referring more particularly to the drawings in which a preferred example of my invention is disclosed, A designates the frame of an automobile and B and C the front and rear springs, respectively. A substantially L-shaped supporting plate 10 is fixedly secured in well known manner on the under side of the springs B and C. This plate is of special construction and in addition to being associated with the springs is adapted through the portion 12 to adjustably engage with and support the lifting jack 17. A plurality of orifices 11 are provided in this plate to receive the spring-retaining bolts while the portion 12 is formed with an opening 13 to engage with the stem of the jack 17 and is also split at the extremity as at 14 to form clamping jaws 15 through which a clamping screw 16 extends.

Referring now to the jack 17 which is of ordinary construction and adapted to extend through the orifice 13 in the plate 12 to be held ready for use at any time by being clamped therein under the influence of the screw 16, the jack is provided with a foot 18 and is operable at a distance, as illustrated in Figure 1, by means of a rod 19 adapted at its inner end to engage with a spindle $19^a$ which in turn is adapted in well known manner to operate, through a series of gears, the screw-threaded stem or rod 22 of the jack whereby, on the rod 19 being turned through the operating wheel 20, the jack is raised or lowered. The foot 18 is provided with a flange 21 to form a cover or closure for the screw-threaded stem 22 when moved upwardly.

From the foregoing it will be seen that the combination with the spring supporting plate 10 adapted to adjustably support a lifting jack in a vertical position by means of clamping jaws integral with said plate provides for the convenient equipment of a jack ready for use for each wheel of an automobile to operate any of which it is only necessary to slip the operating rod 19 onto the projecting spindle $19^a$ and raise the jack to raise the individual wheel in the ordinary way.

It will thus be seen that the jack forms for all practical purposes whether in operation or not an integral part of the construction of the vehicle, always readily accessible for use and thus saving considerable trouble and time as well as tending to make the vehicle or automobile self-contained without taking up extra space or affecting the existing construction in any way.

In the example of my invention shown a single threaded rod is shown and is held in the casing from turning, the nut being turned by lowering and raising the jack. In cases where the body is close to the axles a slightly different construction may be employed involving two threaded rods one inside the other telescopically giving double length of thread when exposed or being more compact when closed.

While one or more of my improved jacks may be used I preferably as disclosed in the accompanying drawings use four, one for each wheel.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:—

1. In a lifting jack for vehicles, a combined spring-supporting and jack-supporting plate of substantially L-shaped formation provided at one end with a plurality of orifices to engage with the spring retaining bolts and split at the other end and formed with an opening co-operating with the split, jaws integral with the split end, and an adjusting screw extending through said jaws.

2. In a device of the character described and in combination, a lifting jack, a substantially L-shaped plate formed with bolt openings at one end, a split at the other end to engage with and support a lifting jack in vertical position, clamping jaws integral with the split end, and an adjusting screw through said jaws whereby the jaws are tightened to clamp the jack and slackened to permit vertical movement of the jack therein.

In witness whereof I have hereunto set my hand.

JAMES HAROLD CURRIE MURDOCH.